US007438225B2

(12) United States Patent
Schneider et al.

(10) Patent No.: US 7,438,225 B2
(45) Date of Patent: Oct. 21, 2008

(54) BIOMETRIC AUTHENTICATION DEVICE AND METHOD

(75) Inventors: John K. Schneider, Snyder, NY (US); James T. Baker, Lockport, NY (US); Fred W. Kiefer, Clarence, NY (US)

(73) Assignee: Ultra-Scan Corporation, Amherst, NY (US)

( * ) Notice: Subject to any disclaimer, the term of this patent is extended or adjusted under 35 U.S.C. 154(b) by 0 days.

(21) Appl. No.: 11/458,559

(22) Filed: Jul. 19, 2006

(65) Prior Publication Data

US 2008/0230602 A1 Sep. 25, 2008

Related U.S. Application Data

(60) Provisional application No. 60/700,675, filed on Jul. 19, 2005.

(51) Int. Cl.
*G06K 5/00* (2006.01)

(52) U.S. Cl. ...................................... 235/382; 235/380

(58) Field of Classification Search ................. 235/382, 235/380, 385, 435, 438, 439
See application file for complete search history.

(56) References Cited

U.S. PATENT DOCUMENTS

| | | | | |
|---|---|---|---|---|
| 6,119,096 | A | 9/2000 | Mann et al. | |
| 6,193,153 | B1 | 2/2001 | Lambert | |
| 6,959,874 | B2 * | 11/2005 | Bardwell | 235/493 |
| 7,047,419 | B2 * | 5/2006 | Black | 713/186 |
| 7,114,646 | B2 * | 10/2006 | Hillhouse | 235/375 |
| 7,165,717 | B2 * | 1/2007 | Matzig | 235/379 |
| 2003/0135097 | A1 | 7/2003 | Wiederhold et al. | |

* cited by examiner

*Primary Examiner*—Daniel StCyr
(74) *Attorney, Agent, or Firm*—Hodgson Russ LLP

(57) ABSTRACT

The invention may be embodied as an identity authentication system or method. A system according to the invention may have a biometric sensor capable of providing static biometric indications, an adhesive capable of positioning the sensor on an organism, and a computer in communication with the sensor. The computer may have software running on the computer in order to (a) cause the computer to determine whether there is a match between a subsequent static biometric indication and an initial static biometric indication, and (b) cause the computer to send a signal indicating whether a match was determined in order to authenticate the identity of the organism.

28 Claims, 3 Drawing Sheets

FIG. 3
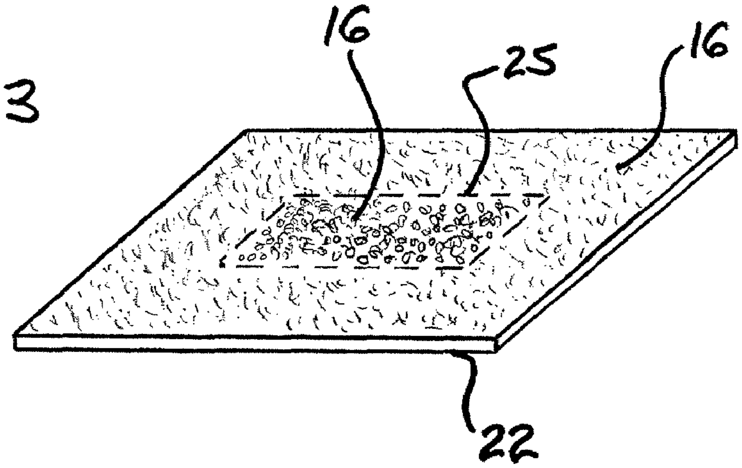
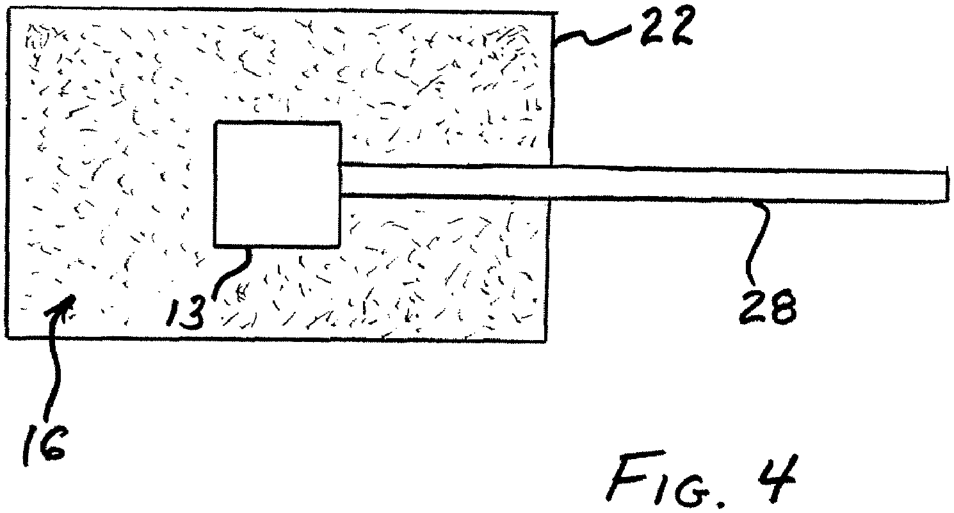
FIG. 4

BIOMETRIC AUTHENTICATION DEVICE AND METHOD

CROSS-REFERENCE TO RELATED APPLICATION

This application claims the benefit of priority to U.S. provisional patent application Ser. No. 60/700,675, filed on Jul. 19, 2005.

FIELD OF THE INVENTION

The present invention relates to systems and methods of authenticating a person's identity.

BACKGROUND OF THE INVENTION

Positively authenticating the identity of an individual is critical to the safety and success of many endeavors, including military and medical activities. And yet a U.S. Government Accounting Office report found poor access controls protecting sensitive information and operations, making them vulnerable to attack from all over the world with only minimal computer and telecommunications expertise. With the increasing need and desire to utilize complex and sensitive systems in situations which were previously not needed or desirable for those situations, a biometric assurance system is needed to prevent unauthorized use of such systems.

SUMMARY OF THE INVENTION

The invention may be embodied as an identity authentication system having a biometric sensor capable of providing static biometric indications, an adhesive capable of positioning the sensor on an organism, and a computer in communication with the sensor. The computer may have software running on the computer in order to (a) cause the computer to determine whether there is a match between a subsequent static biometric indication and an initial static biometric indication, and (b) cause the computer to send a signal indicating whether a match was determined in order to authenticate the identity of the organism.

The invention may be embodied as a method of authenticating an organism's identity. In one such method, a biometric sensor is provided, and the sensor is fixed to a position on an organism's body at a location where static biometric indications will be obtained from the organism's body using the sensor. The sensor is used to obtain an initial static biometric indication of the location, and that initial static biometric indication is stored. Then a subsequent static biometric indication is obtained and compared to the initial static biometric indication. A determination may be made as to whether the subsequent static biometric indication matches the initial static biometric indication. Then a signal may be provided, in order to indicate whether the subsequent static biometric indication matches the initial static biometric indication.

Initially, the identity of an individual may be established. For example, the identity of an individual may be established using a high quality and highly accurate biometric system. Subsequently, the identity of the individual may be authenticated using a system according to the invention, which may be simpler and cheaper to manufacture than the system that is used to initially establish the identity of the individual. In this manner, confidence in a previous identification may be maintained. Portions of a system according to the invention may be made at such low cost that they may be considered disposable.

There are a number of uses to which the invention may be put. For example, the invention may be used to protect critical systems, such as communications systems, from being used by unauthorized individuals. There are medical and safety applications contemplated for the invention as well.

BRIEF DESCRIPTION OF THE DRAWINGS

For a fuller understanding of the nature and objects of the invention, reference should be made to the accompanying drawings and the subsequent description. Briefly, the drawings are:

FIG. 3, which is a perspective view of a patch according to the invention;

FIG. 4, which is a schematic representation of a sensor and patch according to the invention.

FURTHER DESCRIPTION OF THE INVENTION

Figure 1:
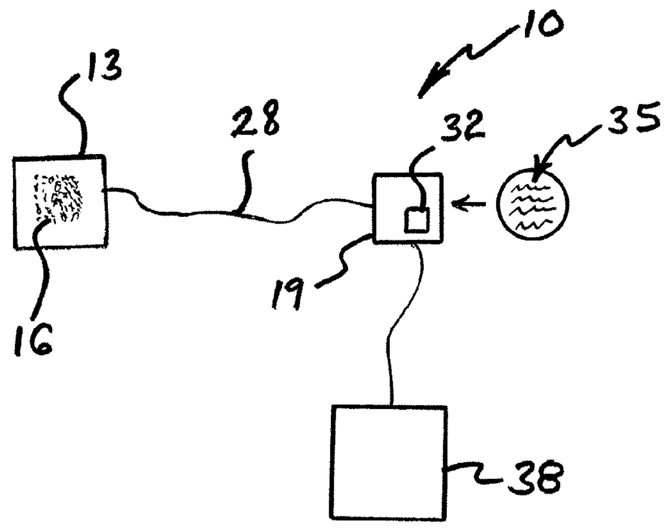
FIG. 1, which is a schematic representation of a system according to the invention.
Figure 2:
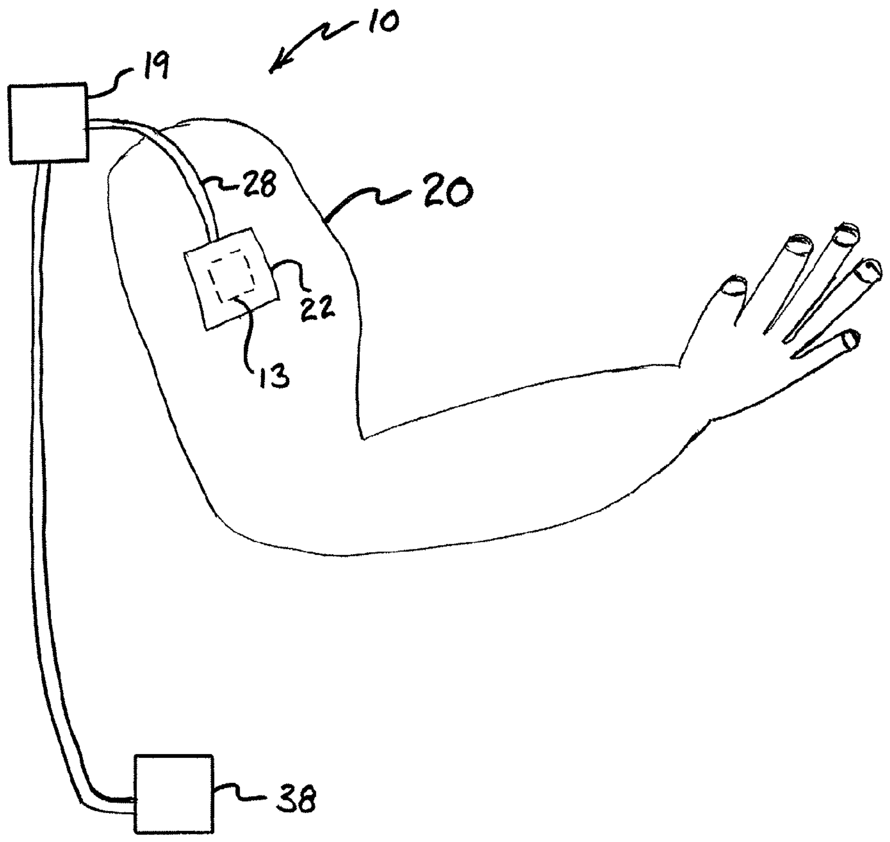
FIG. 2, which depicts the system mounted to an arm of an organism.

The invention may be embodied as an identity authentication system 10. FIG. 1 depicts one such system 10. The system 10 may include a biometric sensor 13, an adhesive 16 and a computer 19. The biometric sensor 13 may be capable of providing static biometric indications to the computer 19. FIG. 2 depicts another system according to the invention that has been positioned on an organism 20, in this case, the arm of the organism 20. A static biometric indication may be information about physical features of the organism 20 that can be used to authenticate the identity of the organism 20. With respect to human beings, a common example of a biometric indication is a fingerprint image. Other types of biometric indications include the arrangement of hair follicles, the arrangement of pores and imperfections in the skin. It should be noted that a biometric indication that may be used for authenticating the identity of an organism 20 may use more than one type of physical feature, and so for example, a biometric indication may use the relative locations of ridges in the skin, hair follicles and pores to authenticate the identity of an organism 20.

It may be implied from the prior statements that the invention is not limited to use on a finger. Many locations may be used. For example, the arrangement of hair follicles and skin dermatoglyphics can be used for identification purposes, and so a human being's back, forearm or bicep may provide a suitable location for obtaining static biometric indications.

It should be noted that static biometric indications may be obtained from animals other than a human being in much the same manner as such indications would be obtained from a human being. Static biometric indications also may be obtained from plants. Furthermore, static biometric indications need not be obtained from living organisms 20. Static biometric indications may be obtained from a dead organism 20, such as a human cadaver.

The sensor 13 may obtain information corresponding to the locations where the organism 20 contacts the sensor 13. For example, the sensor 13 may obtain information by sensing pressure exerted on the sensor 13 by the organism 20, or the biometric sensor 13 may sense conductivity between the sensor 13 and the portion of the organism 20 that is in contact with the sensor 13. Such sensors 13 are currently available for use in fingerprint imaging systems, but these sensors 13 may be used to provide information about other parts of an organism 20. An example of such a sensor 13 is the BLP-100 provided by the BMF Corporation of Japan. The BLP-100 is an example of a pressure sensitive fingerprint sensor 13. Some of the types of sensors 13 that may be used to obtain biometric indications will use an array of tiny sensors. For example, a low-cost, low-power and thin sensor 13 may be made using a thin-film transistor array, such as those used to obtain biometric information about fingerprints.

The sensor 13 may provide sufficient resolution by spacing the sensing locations very closely. For example, a sensor 13 in which 500 sensing locations are distributed across a one square-inch area may provide sufficient resolution to authenticate the identity of a human being.

The system 10 also may include an adhesive 16, such as a pressure sensitive adhesive. One such adhesive 16 may be found on self-stick bandages commonly sold in grocery stores and pharmacies to the general public. The adhesive 16 may be used to fix the position of the sensor 13 on the organism 20 at a location from which the static biometric indications will be obtained.

The adhesive 16 may be applied to a patch 22 and the biometric sensor 13 may be placed between the patch 22 and the organism 20 so as to position the sensor 13 on the organism 20 at a location from which the static biometric indication will be obtained. The adhesive 16 prevents the sensor 13 from moving relative to the location. FIG. 3 depicts adhesive 16 on a patch 22. A dashed line 25 is shown on the patch 22 in order to identify adhesive 16 inside the rectangle formed by the dashed line 25, which may be used to attach the sensor 13 to the patch 22. The adhesive 16 shown outside the rectangle formed by the dashed line 25 may be used to attach the patch 22 to the organism 20. The adhesive 16 used to attached the sensor 13 to the patch 22 may be the same or different from the adhesive used to attach the patch 22 to the organism 20.

The patch 22 may be made from a flexible material, such as cloth, paper, vinyl or rubber-coated fabric, in order to accommodate surfaces having different shapes or surfaces having variable shapes.

The patch 22 may also serve to protect the sensor 13. For example, the patch 22 may be made resistant to moisture by coating a fabric with silicone or other water-resistant coatings, and thereby prevent water from damaging the sensor 13. The sensor 13 may be protected from water by encapsulating the sensor 13 in a water-resistant material such as paralene, urethane, epoxy or silicone. Further, the patch 22 may be made resistant to certain types of radiation by including an ultra-violet stabilizer on the patch 22, or using a metal coating on the patch 22, and thereby protect the sensor 13 from the effects of radiation.

FIG. 4 depicts a sensor 13 on the patch 22. Once placed on the organism 20, an output signal from the sensor 13 may be periodically sampled, or the sensor 13 may be periodically activated to provide an output signal, in order to determine whether the location sensed by the sensor 13 has changed. If it is determined that the location of the sensor 13 has changed, this may indicate that the sensor 13 has been removed from the organism 20. FIG. 4 shows a communication cable 28, which may be used to provide biometric indications from the sensor 13. The cable 28 also may be used to provide instructions to the sensor 13.

The system 10 may include a computer 19. The computer 19 may be in communication with the sensor 13, and may have software running thereon for (a) causing the computer 19 to obtain biometric indications corresponding to the location where the sensor 13 is positioned, (b) causing the computer 19 to determine whether there is a match between an initial static biometric indication and a subsequent static biometric indication, and (c) causing the computer 19 to send a signal indicating whether a match was determined, in order to authenticate an identity of the organism 20.

To use a system 10 according to the invention, the organism 20 may be previously identified as being an authorized organism, for example by providing a passport. Then the sensor 13 may be positioned on the authorized organism 20, and an initial static biometric indication may be obtained by the computer 19 using the sensor 13. The initial static biometric indication may be stored, for example in a read-only-memory 32, for later use. When it is necessary to determine whether an activity should be performed, the software 35 may cause the computer 19 to obtain a subsequent static biometric indication from the sensor 13. The software 35 may be a set of instructions that are executable by the computer. The computer 19 may then compare, in accordance with the software 35, the subsequent static biometric indication to the initial static biometric indication and determine whether there is a match between the static biometric indications. The software 35 may cause the computer 19 to send a signal indicating whether a match was determined. One such signal may be an alarm signal, which may be sent when the initial static biometric indication is determined not to match the subsequent static biometric indication. Depending on the signal sent by the computer 19, certain actions may or may not be permitted.

The computer 19 and sensor 13 may communicate with each other via a wired or a wireless communication system. In a wired communication system, the sensor and the computer may communicate with each other over wires extending between the sensor and the computer. Such a wired communication system may be more reliable and more secure than a wireless communication system.

In a wireless communication system, a transmitter may be provided with the sensor 13 in order to provide information to the computer 19. In some systems according to the invention, a receiver may also be provided with the sensor 13 in order to allow the computer 19 to provide instructions to the sensor 13. Similarly, a receiver (and in some systems, a transmitter) may be provided with the computer 19 in order to receive information from the sensor 13 (and in some systems to provide instructions to the sensor 13). By using a wireless communication system, the sensor 13 need not be closely located to the computer 19, and the distance between the sensor 13 and the computer 19 may be allowed to vary.

Figure 5:
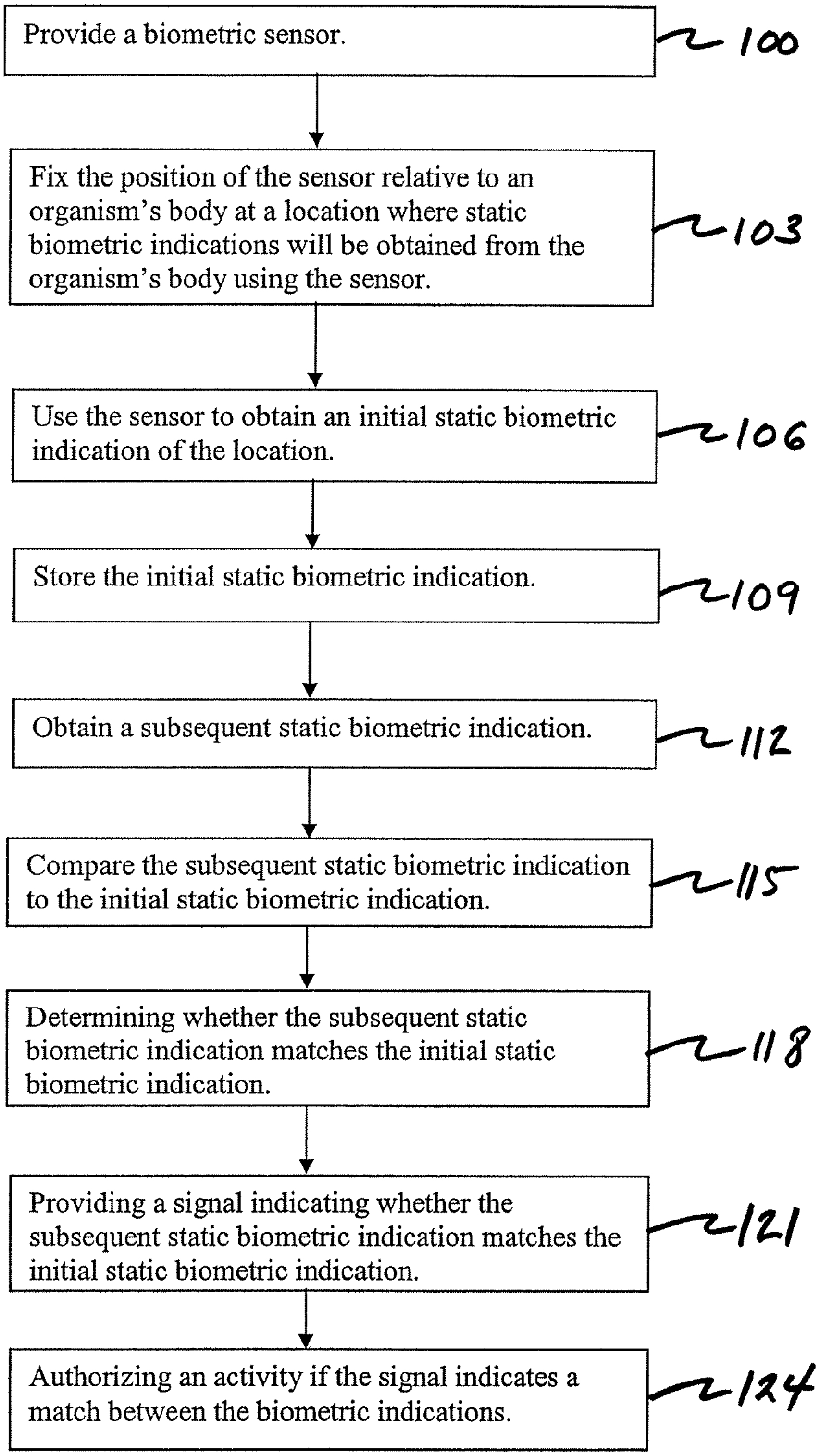
FIG. 5, which depicts a method according to the invention.

The invention may be embodied as a method. FIG. 5 depicts one such method. In one such method, an organism's identity is authenticated by providing 100 a biometric sensor and fixing 103 a position of the sensor relative to the organism's body at a location where static biometric indications will be obtained from the organism's body using the sensor. Fixing the position of the sensor may be accomplished by providing an adhesive patch so that the sensor resides between the patch and the organism's body. Then the sensor may be used 106 to obtain an initial static biometric indication of the location, and that initial static biometric indication may be stored 109 in a computer memory for later use. A subsequent static biometric indication may be obtained 112 and compared 115 to the initial static biometric indication. Next, a determination may be made 118 as to whether the subsequent static biometric indication matches the initial static biometric indication, and a signal may be provided 121 which indicates whether the subsequent static biometric indication matches the initial static biometric indication.

Such a method of authenticating an organism's identity may be used to authorize an activity. If the signal indicates a match has been determined, then an activity may be authorized 124 by the computer. For example, a piece of machinery

38 may be in communication with the computer 19, and when a match has been determined, the computer 19 may cause a switch to be moved, thereby causing power to be provided to the machinery 38, and thereby allow the organism to operate the machinery 38. Such machinery 38 may include, for example, a radio carried by a soldier who has the sensor on his back. The computer 19 may periodically receive a subsequent static biometric indication, and as long as a match is determined with the initial static biometric indication, the radio will be allowed to operate. However, when a subsequent static biometric indication and the initial biometric indication are compared, but no match is found, then the radio may be caused to send a distress signal to indicate that the soldier may have been killed or captured, and/or power to the radio may stopped or the radio may be instructed to erase memory devices in order to prevent an enemy from using the radio or gaining access to sensitive information.

As another example, a medical patient may be provided with a sensor 13 according to the invention. When a medical service person, such as a doctor or nurse, arrives to perform a procedure, the medical service person may arrive with the computer 19. The computer 19 will receive a subsequent static biometric indication from the sensor 13, either because the computer 19 instructed the sensor to provide the subsequent biometric indication, or because the sensor 13 periodically provides subsequent static biometric indications without being instructed to do so. If a match is determined between the initial and subsequent static biometric indications, then the computer 19 may query a database to determine the procedure that has been ordered for that patient. Upon determining what procedure should be performed, the computer 19 may indicate, for example via a monitor, to the medical service person the details of the procedure to be performed. For example, a nurse may be instructed to administer morphine to one patient, and then later may be instructed to prepare another patient for a surgical procedure by shaving his right leg. In this manner, errors may be reduced.

It will now be understood that the invention may be practiced using an inexpensive, light-weight, low-power device. The sensor 13 may be suitable for wearing by an individual even though that individual is wearing protective equipment, such as nuclear, biological, or chemical protective equipment. Furthermore, a system 10 according to the invention may be combined with other systems in order that information provided by the other systems may be confirmed as having originated from the individual that is indicated by the system 10 according to the invention. For example, in a medical setting, a sensor 13 according to the invention may be associated with a patch 22 that is also associated with a medical monitoring system so that the identity of the patient can be verified at the same time that medical information is provided. As an additional example, in the atomic energy industry, a sensor 13 according to the invention could be used in conjunction with a radiation sensor to verify the identity of the person and simultaneously monitor his/her exposure to radiation. The same could also be applied to monitor exposure to chemicals, toxic gases, and other hazardous substances.

As another example, a system 10 according to the invention may be combined with a radio frequency identification ("RFID") tag. The RFID tag could be used to monitor the location of an organism, and the system 10 would authenticate the identity of the organism. This may be especially useful in monitoring patients in a hospital, or monitoring sailors on a ship.

Unlike traditional biometric matching systems, a system 10 or a method according to the invention may need only maintain that the biometric patterns of interest do not significantly change. Most traditional biometric matching systems compare a template of minutiae locations for the search print and a template for the inquiry print. The errors associated with such traditional biometric systems, both false match of impostors and false non-match of authentic comparisons, often occur due to inaccuracies in these templates. There are many reasons for inaccurate templates. Primary among these are the ease with which variations may occur while imaging a specimen at different times and/or locations. For example, a person's fingerprint may be imaged in many different ways, including by varying pressure applied to the finger and/or the angle at which the finger is presented. Distortion of the friction ridge surface for the finger, rotation of the finger, horizontal and vertical movement of the finger, and image quality, all contribute to the inaccuracies associated with fingerprint matching systems. Similar variations may be imposed when imaging other types of biometrics, and so generally the traditional biometric identification systems suffer from errors. As such, the image processing software in a traditional biometric identification system may miss genuine minutiae and/or generate false minutiae due to artifacts. Hence, two images of the same finger can have different minutiae—some that may be genuinely paired with information in a database, some that are missing from the database, and some that are false.

The present invention represents a marked improvement over traditional biometric identification systems and methods. By fixing the sensor 13 to the organism 20, the biometric indications taken over time should be sufficiently similar to authenticate the identity of organism 20, unless the sensor is removed or the state of the organism 20 changes significantly. For example, if the state of the organism 20 changes from living to dead, then it is expected that the subsequent biometric indication (taken from the dead organism 20) will differ significantly from the initial biometric indication. (taken from the living organism 20). In this manner, the invention may be used to signal when the organism 20 has died.

It is not expected that the biometric indications will be identical from scan to scan, even when the sensor 13 remains fixed to the organism 20 and the state of the organism 20 does not change. For example, for static fingerprint images generated by a system 10 according to the invention, it is anticipated that there will be differences between biometric indications. For example, some biometric indications may have more minutiae than others, or some may be missing minutiae, or some may have disjoint sets of false minutiae. However, the vast majority of the minutiae constellation on the indications should correlate closely.

If the differences between an initial fingerprint indication and a subsequent fingerprint indication were to become substantial over time, it would be expected, baring a calamity, that those differences would evolve slowly. In such a time-varying case, the system might reset the baseline image used for identity verification. For example, the $500^{th}$ subsequent biometric indication might be compared to $250^{th}$ subsequent biometric indication, rather than the initial biometric indication, provided that the $250^{th}$ subsequent biometric indication was sufficiently similar to the initial biometric indication to assure that the identity criteria of the system are met.

Traditional identification devices require a very accurate biometric specimen, (which may have been obtained under a particular set of conditions) so that it can be compared to an enrolled accurate biometric specimen (which may have been obtained under a different set of conditions). A system according to the invention minimizes the ability to provide specimens under different conditions, and therefore the specimens required for authentication purposes need not be as accurate as those required for traditional identification systems. So, if physical data points are skewed in a biometric indication, they will tend to remain skewed in subsequent indications of the biometric. If false minutia are included in a biometric indication, they will tend to remain included in subsequent biometric indications. If minutia are missing from a biometric indication, they will tend to remain missing from subsequent biometric indications. A system 10 according the invention may be structured so that authenticating a person's identity requires only that one biometric indication obtained from the specimen area is not too different from a subsequent biometric indication obtained from the specimen area, and one or more threshold values may be set in order for the system to determine whether the indications are too different to constitute a match. If the number of differences or the types of differences exceed the threshold value(s), then the system may provide the alarm signal, discussed above.

U.S. provisional patent application No. 60/700,675 discloses additional details about the invention and additional embodiments of the invention. The disclosure of that patent application is incorporated by this reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An assurance system, comprising:

a biometric sensor capable of providing an initial static biometric indication and capable of providing a subsequent static biometric indication;

an adhesive capable of fixing the sensor on an organism at a location from which the static biometric indications will be obtained, and capable of fixing the sensor for a period of time extending between taking the initial and subsequent static biometric indications;

a computer in communication with the sensor, and having software running thereon for:

(a) causing the computer to determine whether there is a match between the subsequent static biometric indication and the initial static biometric indication, and (b) in response to a determination that the initial static biometric indication does not match the subsequent static biometric indication, causing the computer to send a signal indicating that the location of the sensor has changed.

2. The system of claim 1, wherein the sensor includes an array of pressure-sensitive devices.

3. The system of claim 2, wherein the sensor includes a thin-film transistor array.

4. The system of claim 1, wherein the sensor includes an array of conductivity-sensitive devices.

5. The system of claim 1, further comprising a patch having the adhesive thereon.

6. The system of claim 5, wherein the adhesive is a pressure-sensitive adhesive.

7. The system of claim 5, wherein a portion of the adhesive attaches the sensor to the patch, and a different portion of the adhesive attaches the patch to the organism.

8. The system of claim 1, further comprising a receiver and a transmitter, and wherein the computer is in communication with the sensor via a wireless communication system established between the receiver and the transmitter.

9. The system of claim 1, wherein the computer is in communication with the sensor via a wired communication system.

10. The system of claim 1, wherein the software instructs the computer to send an alarm signal when the subsequent static biometric indication does not match the initial static biometric indication.

11. The system of claim 1, wherein the organism is a human being.

12. The system of claim 1, wherein the organism is an animal other than a human being.

13. The system of claim 1, wherein the organism is dead.

14. The system of claim 1, wherein the organism is a plant.

15. An assurance method, comprising:

providing a biometric sensor;

fixing a position of the sensor relative to an organism's body at a location where static biometric indications will be obtained from the organism's body using the sensor, and the position being fixed for a period of time extending between taking an initial static biometric indication of the location and a subsequent static biometric indication;

using the sensor to obtain the initial static biometric indication of the location;

storing the initial static biometric indication;

using the sensor to obtain the subsequent static biometric indication;

comparing the subsequent static biometric indication to the initial static biometric indication;

determining whether the subsequent static biometric indication matches the initial static biometric indication;

in response to a determination that the initial static biometric indication does not match the subsequent static biometric indication providing a signal indicating that the location of the sensor has changed.

16. The method of claim 15, wherein fixing the position of the sensor includes providing an adhesive patch so that the sensor resides between the patch and the organism's body.

17. The method of claim 15, wherein the organism is a human being.

18. The method of claim 15, wherein the organism is an animal other than a human being.

19. The method of claim 15, wherein the organism is dead.

20. The method of claim 15, wherein the organism is a plant.

21. An assurance method of authorizing an activity, comprising:

providing a biometric sensor;

fixing a position of the sensor relative to an organism's body at a location where static biometric indications will be obtained from the organism's body using the sensor, and the position being fixed for a period of time extending between taking an initial static biometric indication of the location and a subsequent static biometric indication of the location;

using the sensor to obtain the initial static biometric indication of the location;

storing the initial static biometric indication;

using the sensor to obtain the subsequent static biometric indication;

comparing the subsequent static biometric indication to the initial static biometric indication;

determining whether the subsequent static biometric indication matches the initial static biometric indication;

in response to a determination that the initial static biometric indication does not match the subsequent static biometric indication providing a signal indicating that the location of the sensor has changed; and preventing the activity if the signal indicates that the location of the sensor has changed.

22. The method of claim 21, wherein the activity is the use of a machine by the organism.

23. The method of claim 21, wherein the activity is receipt of medical treatment provided to the organism.

24. The method of claim 21, wherein the activity is a procedure performed on the organism.

25. The method of claim 21, wherein the organism is a human being.

26. The method of claim 21, wherein the organism is an animal other than a human being.

27. The method of claim 21, wherein the organism is dead.

28. The method of claim 21, wherein the organism is a plant.

* * * * *

UNITED STATES PATENT AND TRADEMARK OFFICE

CERTIFICATE OF CORRECTION

PATENT NO. : 7,438,225 B2
APPLICATION NO. : 11/458559
DATED : October 21, 2008
INVENTOR(S) : Schneider et al.

It is certified that error appears in the above-identified patent and that said Letters Patent is hereby corrected as shown below:

Claim 15, line 21, “indication” should read --indication,--; and

Claim 21, line 22, “indication” should read --indication,--.

Signed and Sealed this

Tenth Day of February, 2009

JOHN DOLL
*Acting Director of the United States Patent and Trademark Office*

UNITED STATES PATENT AND TRADEMARK OFFICE

CERTIFICATE OF CORRECTION

PATENT NO. : 7,438,225 B2
APPLICATION NO. : 11/458559
DATED : October 21, 2008
INVENTOR(S) : Schneider et al.

It is certified that error appears in the above-identified patent and that said Letters Patent is hereby corrected as shown below:

Column 8, Claim 15, line 31, “indication” should read --indication,--; and

Column 8, Claim 21, line 64, “indication” should read --indication,--.

This certificate supersedes the Certificate of Correction issued February 10, 2009.

Signed and Sealed this

Tenth Day of March, 2009

John Doll

JOHN DOLL
*Acting Director of the United States Patent and Trademark Office*